United States Patent
Nusser

(10) Patent No.: US 11,149,147 B2
(45) Date of Patent: Oct. 19, 2021

(54) POLYMERIC DYES BASED ON POLY(AMIDOAMINES)

(71) Applicant: Archroma IP GmbH, Reinach (CH)

(72) Inventor: Rainer Nusser, Neuenburg am Rhein (DE)

(73) Assignee: Archroma IP GmbH, Reinach (CH)

( * ) Notice: Subject to any disclaimer, the term of this patent is extended or adjusted under 35 U.S.C. 154(b) by 87 days.

(21) Appl. No.: 15/772,726

(22) PCT Filed: Nov. 2, 2016

(86) PCT No.: PCT/EP2016/001814
§ 371 (c)(1),
(2) Date: May 1, 2018

(87) PCT Pub. No.: WO2017/076496
PCT Pub. Date: May 11, 2017

(65) Prior Publication Data
US 2018/0319990 A1 Nov. 8, 2018

(30) Foreign Application Priority Data
Nov. 3, 2015 (EP) .................................... 15003146

(51) Int. Cl.
| | | |
|---|---|---|
| *C09B 69/10* | (2006.01) | |
| *C11D 3/40* | (2006.01) | |
| *C09D 11/037* | (2014.01) | |
| *C09D 11/17* | (2014.01) | |

(52) U.S. Cl.
CPC ............ *C09B 69/106* (2013.01); *C09B 69/10* (2013.01); *C09B 69/101* (2013.01); *C09D 11/037* (2013.01); *C09D 11/17* (2013.01); *C11D 3/40* (2013.01)

(58) Field of Classification Search
CPC .. G02B 1/10; C08K 5/20; A01N 25/04; C09B 67/0098; C09D 11/322
See application file for complete search history.

(56) References Cited

U.S. PATENT DOCUMENTS

| | | | |
|---|---|---|---|
| 5,534,052 A | 7/1996 | Mennicke et al. | |
| 5,773,405 A | 6/1998 | Bruhnke | |
| 5,789,515 A | 8/1998 | Bruhnke | |
| 6,312,679 B1 * | 11/2001 | Tomalia | A01N 25/10 424/78.08 |
| 2012/0220734 A1 | 8/2012 | Kim et al. | |
| 2017/0304213 A1 * | 10/2017 | Shi | A61K 48/0041 |

FOREIGN PATENT DOCUMENTS

| | | |
|---|---|---|
| EP | 0657509 A1 | 6/1995 |
| EP | 0864616 A1 | 9/1998 |
| EP | 0864617 A1 | 9/1998 |
| JP | H07-196942 A | 8/1995 |
| JP | 2013-534268 A | 9/2013 |
| WO | 03014743 A2 | 2/2003 |
| WO | 2009030344 A2 | 3/2009 |
| WO | 2011068978 A1 | 6/2011 |
| WO | 2012022709 A1 | 2/2012 |

OTHER PUBLICATIONS

Dodangeh et al. "Synthesis and functionalization of polyamidoamine dendrimers with thiazol derivatives to prepare novel disperse dyes and their application on polyethylene terephthalate (PET) (Dyes and Pigments", 116 (2015) 20-26, Published online Jan. 13, 2015.*
Falbe, et al., "Polyaminoamide," RÖMPP Chemie Lexikon, (1992), vol. 5: 3512.
PCT International Search Report for PCT/EP2016/001814, dated Jan. 23, 2017.

* cited by examiner

*Primary Examiner* — Gregory Listvoyb
(74) *Attorney, Agent, or Firm* — McBee Moore & Vanik IP, LLC

(57) ABSTRACT

Colorant of formula (I):

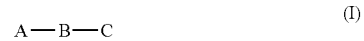

$$A-B-C \qquad (I)$$

wherein
A signifies a monovalent organic residue comprising a chromophore group;
B signifies a bivalent organic residue selected from the class consisting of aromatic, heteroaromatic, cycloaliphatic and aliphatic groups containing from 2 to 10 carbon atoms, optionally substituted;
and
C signifies the residue of compound comprising at least one amido group, one primary amino group, and one secondary amino group, wherein C is linked to B via a nitrogen atom of an amino group, wherein said compound is a poly(amidoamine).

18 Claims, No Drawings

POLYMERIC DYES BASED ON POLY(AMIDOAMINES)

CROSS-REFERENCE TO RELATED APPLICATIONS

This application is a National Stage entry of International Application No. PCT/EP2016/001814, filed Nov. 2, 2016, which claims priority to European Patent Application No. 15003146.6, filed Nov. 3, 2015.

BACKGROUND

FIELD OF THE INVENTION

The present invention relates to a colorant comprising the residue of a poly(amidoamine), to a method of making same, to a composition comprising said colorant, and to various articles of manufacture comprising said colorant or composition.

DESCRIPTION OF RELATED ART

It is known to reduce the staining properties of reactive dyes by reacting same with suitable polymers. The resulting polymeric dyes may e.g. be used for staining detergents. Due to the reduced staining properties, the polymeric dyes stain only the detergent but not e.g. textiles to be cleaned by means of said detergents. Exemplary polymeric dyes may be based on a variety of polymers such as poly(oxyalkylene) as e.g. disclosed in EP 0 864 617, or polyether polyols as e.g. disclosed in WO 2009/030344, or polyglycerol as disclosed in WO 2009/030344.

SUMMARY

There is a steady need in the industry to provide dyes for staining of e.g. detergents.

This object has been achieved with polymeric dyes based on a compound comprising at least one amido group, one primary amino group, and one secondary amino group, wherein said compound is a poly(amidoamine).

Specifically, in a first aspect, the invention relates to a colorant of formula (I):

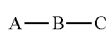

A—B—C     (I)

wherein in formula (I)
A signifies a monovalent organic residue comprising a chromophore group;
B signifies a bivalent organic residue selected from the class consisting of aromatic, heteroaromatic, cycloaliphatic and aliphatic groups containing from 2 to 10 carbon atoms, optionally substituted;
C signifies the monovalent residue of a compound comprising at least one amido group, one primary amino group, and one secondary amino group, wherein C is linked to B via a nitrogen atom of an amino group, wherein said compound is a poly(amidoamine).

In one embodiment, A in formula (I) is an organic residue comprising one or more of the following chromophore groups: azo, azo metal complex, phthalocyanine, anthraquinone, aza[18]annulene, formazane-copper-complex, triphenodioxazine, nitroso, nitro, diarylmethane, triarylmethane, xanthene, acridine, methine, thiazole, indamine, azine, oxazine, thiazine, chinoline, indigoide, indophenol, lactone, aminoketone, hydroxyketone, and stilbene.

In one embodiment, said poly(amidoamine) is the reaction product of a branched or non-branched amine with an acrylate or methacrylate in a Michael-Addition, wherein the product formed in said Michael-Addition subsequently is subjected to polycondensation to afford said poly(amidoamine).

In one embodiment, the average molecular weight Mw of said poly(amidoamine) is in the range of from 1,000 to 1,000,000 g/mole, preferably from 1,000 to 500,000 g/mole, the molecular weight being determined using static light scattering.

In a second aspect, the invention relates to a method of making a colorant according as defined in the first aspect, wherein a reactive dye A-B is reacted with a poly(amidoamine) to afford said colorant A-B—C.

In one embodiment, B in the reactive dye A-B is selected from a residue comprising a moiety selected from dihalogenotriazine, dihalogenopyrimidine, trihalogenopyrimidine, dihalogenoquinoxaline, dihalogenophthalazine, sulfatoethylsulfone, chloroethylsulfone, vinylsulfone, α-halogenoacrylamide, and α,β-dihalogenopropionylamide.

In one embodiment, B in the reactive dye A-B is selected from

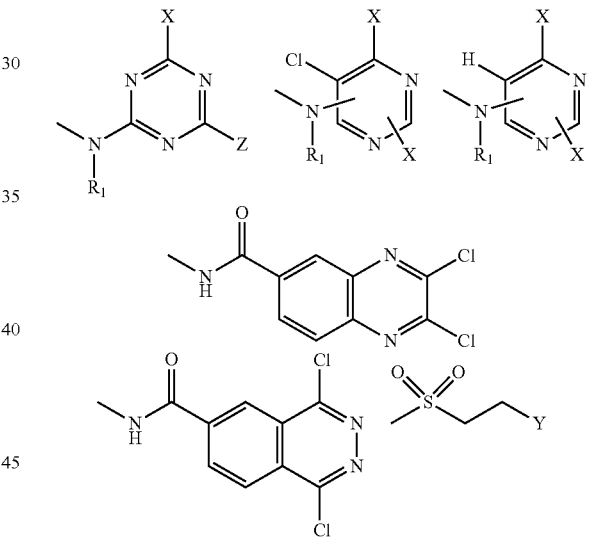

wherein the free valence symbolizes the link from B to A, and
wherein
$R_1$ is selected from H or substituted or unsubstituted $C_{1-10}$ alkyl group; $R_1$ is preferably H;
X is selected from F or Cl;
when X is Cl, Z is selected from —Cl, —$NR_2R_3$, —$OR_2$;
when X is F, Z is selected from —$NR_2R_3$;
$R_2$ and $R_3$ are independently selected from H, substituted or unsubstituted $C_{1-10}$ alkyl and substituted or unsubstituted aryl groups, preferably wherein said aryl groups are phenyl and are preferably substituted with one or more of —$SO_3H$ or —$SO_2CH_2CH_2Y$, and preferably wherein said $C_{1-10}$ alkyl groups are methyl or ethyl;
Y is any group which is detachable by alkali;
In one embodiment, one equivalent of the reactive dye A-B is reacted with 0.25 to 4 equivalents of the poly(amidoamine).

In a third aspect, the invention relates to a composition comprising a colorant defined in the first aspect, or made by a method defined in the second aspect, and a solvent selected from the group consisting of water, a polar organic solvent, or a mixture of water and a polar organic solvent.

In one embodiment, the solvent comprises water or is water.

In a fourth aspect, the invention relates to an article of manufacture, comprising the colorant as defined in the first aspect, or comprising a colorant made by a method defined in the second aspect, or comprising the composition defined in the third aspect.

In one embodiment, the article of manufacture is selected from the group consisting of cleaning agent, ink, colored pencil, or marker.

In one embodiment, the cleaning agent is selected from detergents and softeners.

In a fifth aspect, the invention relates to the use of a colorant as defined in the first aspect, or use of a colorant made according to the method as defined in the second aspect, or use of a composition as defined in the third aspect, for dyeing or for dyeing cleaning agents, colored pencils, or markers.

In one embodiment, said cleaning agents are detergents or softeners.

In the following, all terms in quotation marks are used in the meaning of the present invention.

DETAILED DESCRIPTION OF A PREFERRED EMBODIMENT

In a first aspect, the invention relates to a colorant of formula I:

A—B—C    (I)

wherein in formula (I)
A signifies a monovalent organic residue comprising a chromophore group;
B signifies a bivalent organic residue selected from the class consisting of aromatic, heteroaromatic, cycloaliphatic and aliphatic groups containing from 2 to 10 carbon atoms, optionally substituted;
C signifies the residue of a compound comprising at least one amido group, one primary amino group, and one secondary amino group, wherein C is linked to B via a nitrogen atom of an amino group, wherein said compound is a poly(amidoamine).

The colorant of formula (I) has good staining properties for e.g. detergents, however, shows low staining properties for textiles.

The term "A" signifies any compound comprising at least one chromophore group.

In colorant of formula (I) A-B—C, A represents a monovalent residue of said compound comprising at least one chromophore group.

In one embodiment, A is an organic compound or monovalent residue comprising one or more of the following chromophore groups: azo, azo metal complex, phthalocyanine, anthraquinone, aza[18]annulene, formazane-copper-complex, triphenodioxazine, nitroso, nitro, diarylmethane, triarylmethane, xanthene, acridine, methine, thiazole, indamine, azine, oxazine, thiazine, chinoline, indigoide, indophenol, lactone, aminoketone, hydroxyketone, and stilbene.

The term "B" signifies any compound which, when linked to A, is capable of converting the resulting compound into a reactive dye A-B.

In reactive dye A-B, B signifies a monovalent organic residue selected from the class consisting of aromatic, heteroaromatic, cycloaliphatic and aliphatic groups containing from 2 to 10 carbon atoms, optionally substituted. The aliphatic groups may be linear or branched. The optional substituents may be selected from $C_{1-4}$ alkyl, $C_{1-4}$ alkoxy, or phenyl.

In colorant of formula (I) A-B—C, B signifies a respective suitable bivalent organic residue selected from the class consisting of aromatic, heteroaromatic, cycloaliphatic and aliphatic groups containing from 2 to 10 carbon atoms, optionally substituted.

In one embodiment, B, when linked to A to form a reactive dye A-B, i.e. when B signifies a monovalent organic residue in the reactive dye, B is selected from a residue comprising a moiety selected from dihalogenotriazine, dihalogenopyrimidine, trihalogenopyrimidine, dihalogenoquinoxaline, dihalogenophthalazine, sulfatoethylsulfone, chloroethylsulfone, vinylsulfone, α-halogenoacrylamide, and α,β-dihalogenopropionylamide.

In one embodiment, in the reactive dye A-B, B is selected from

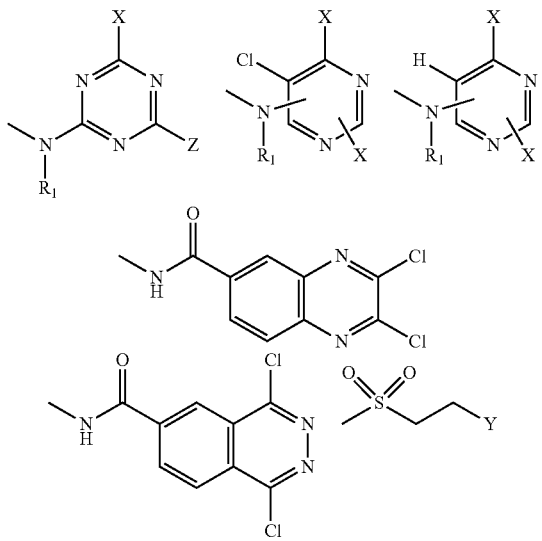

(the free valence symbolizes the link to A)
wherein
$R_1$ is selected from H or substituted or unsubstituted $C_{1-10}$ alkyl group; $R_1$ is preferably H;
X is selected from F or Cl;
when X is Cl, Z is selected from —Cl, —$NR_2R_3$, —$OR_2$;
when X is F, Z is selected from —$NR_2R_3$;
$R_2$ and $R_3$ are independently selected from H, substituted or unsubstituted $C_{1-10}$alkyl and substituted or unsubstituted aryl groups, preferably wherein said aryl groups are phenyl and are preferably substituted with one or more of —$SO_3H$ or —$SO_2CH_2CH_2Y$, and preferably wherein said $C_{1-10}$ alkyl groups are methyl or ethyl;
Y is any group which is detachable by alkali.

The term "$C_{1-10}$ alkyl groups" encompasses linear groups as well as branched groups.

The reactive dye A-B may have any conceivable hue or shade.

In one embodiment, the reactive dye preferably is selected from C.I. Reactive Black 5, C.I. Reactive Blue 2, C.I. Reactive Blue 4, C.I. Reactive Blue 5, C.I. Reactive Blue 7, C.I. Reactive Blue 9, C.I. Reactive Blue 15, C.I. Reactive Blue 19, C.I. Reactive Blue 27, C.I. Reactive Violet 3, C.I. Reactive Violet 5, C.I. Reactive Red 2, C.I. Reactive Red 23, C.I. Reactive Red 24, C.I. Reactive Orange 4, C.I. Reactive Orange 13, C.I. Reactive Orange 16, C.I. Reactive Orange 78, C.I. Reactive Yellow 1, C.I. Reactive Yellow 3, C.I. Reactive Yellow 13, C.I. Reactive Yellow 14, C.I. Reactive Yellow 17, C.I. Reactive Yellow 22 und C.I. Reactive Yellow 95. However, this list does not exclude further reactive dyes.

The term "C" signifies a compound comprising at least one amido group, one primary amino group, and one secondary amino group.

According to the invention, in formula (I) A-B—C, the term "C" signifies the monovalent residue of a compound comprising at least one amido group, one primary amino group, and one secondary amino group, wherein C in formula (I) is the residue of a poly(amidoamine). Preferably, C is linked to B via a nitrogen atom of an amino group of said compound.

Poly(amidoamines) (PAMAM) are known in the art and may be produced according to known methods.

Specifically, a poly(amidoamine) is an organic compound that comprises carbon amide groups and primary and secondary amine groups. The amine groups allow the formation of a covalent bond between the poly(amidoamine) and a reactive dye.

In one embodiment, the poly(amidoamine) is the reaction product of a branched or non-branched amine to an acrylate or methacrylate in a Michael-Addition. The product formed in said Michael-Addition is subsequently subjected to polycondensation.

Accordingly, in one embodiment, the preferred poly(amidoamines) used in the present invention may be formed in a reaction comprising at least two steps:

In a first step, a branched or non-branched amine is added in a Michael-Addition to an acrylate or methacrylate. Preferred amines used in the Michael-Addition are diethylene triamine, triethylene tetramine, tetraethylene pentamine, or polyethylene imine.

The second step is a polycondensation. The reaction sequence is exemplarily shown in the following scheme:

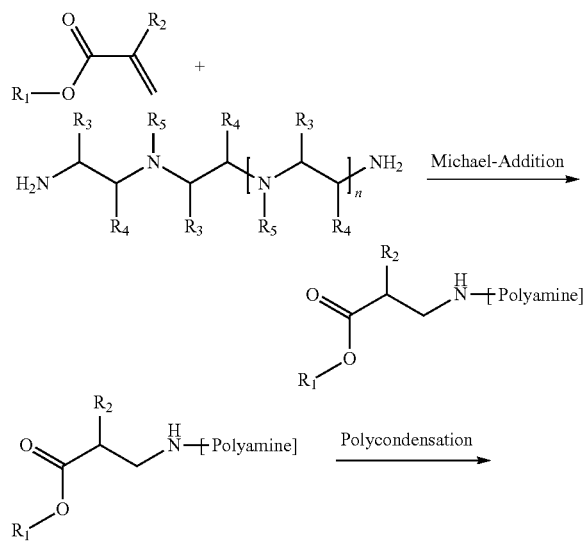

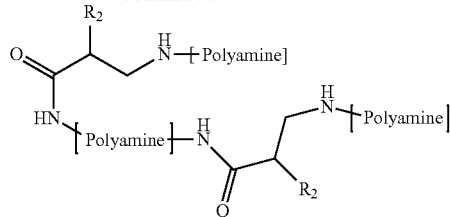

$R_1$ to $R_3$ may independently have the meaning defined above. $R_4$ and $R_5$ may independently have the meaning of $R_1$ to $R_3$.

In one embodiment, the compound from which residue C is derived has an average molecular weight $M_w$ of at least 500 g/mole or 1,000 g/mole, preferably at least 10,000 g/mole. In one embodiment, $M_w$ is in the range of from 1,000 to 1,000,000 g/mole, preferably of from 1,000 to 500,000 g/mole. $M_w$ may be determined using static light scattering according to known methods.

In a further embodiment, the invention relates to a colorant of formula (I):

$$A\!-\!B\!-\!C \tag{I}$$

wherein in formula (I)
A signifies a monovalent organic residue comprising a chromophore group;
B signifies a bivalent organic residue selected from the class consisting of aromatic, heteroaromatic, cycloaliphatic and aliphatic groups containing from 2 to 10 carbon atoms, optionally substituted; or
A-B signifies the residue of a reactive dye; and
C signifies the residue of a compound comprising at least one amido group, one primary amino group, and one secondary amino group, wherein C is linked to B via a nitrogen atom of an amino group, wherein said compound is a poly(amidoamine).

In a second aspect, the invention relates to a method of making a colorant as defined in the first aspect, wherein a reactive dye A-B is reacted with the compound comprising at least one amido group, one primary amino group, and one secondary amino group to afford colorant A-B—C of formula (I).

In one embodiment, one equivalent of the reactive dye A-B is reacted with 0.25 to 4 equivalents of the compound comprising at least one amido group, one primary amino group, and one secondary amino group, i.e. the poly(amidoamine).

The resulting polymeric dye typically is soluble in water and/or polar organic solvents.

This reaction is exemplified in the following scheme for reactive dyes A-B exhibiting five different reactive anchors (B) for eight different reactions 1) to 8) [$H_2N$-polymer=poly(amidoamine) C]:

1)

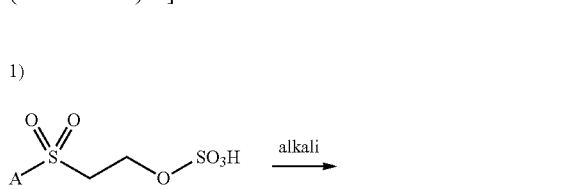

-continued
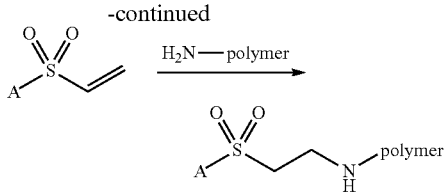
2)
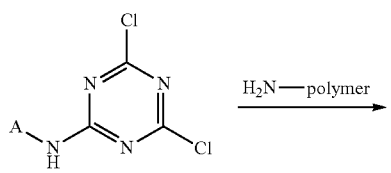
3)
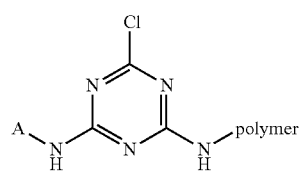
4)
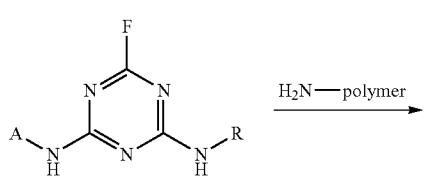
5)
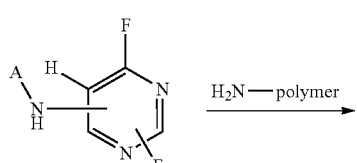
-continued
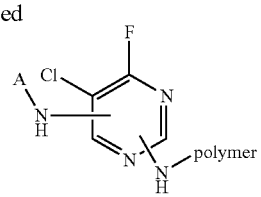
6)
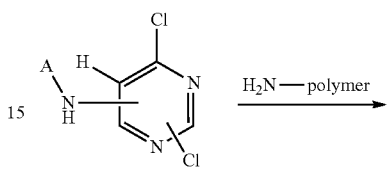
7)
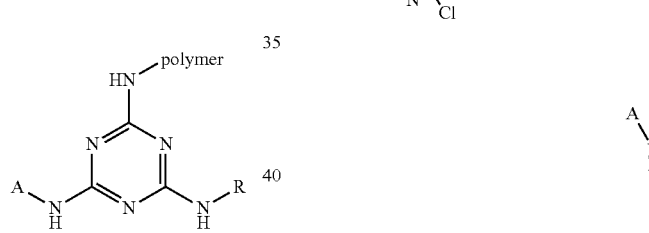
8)
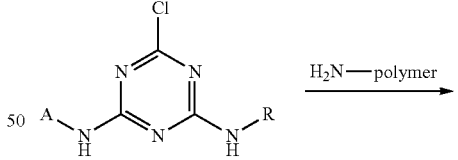
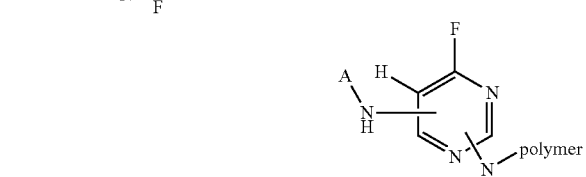
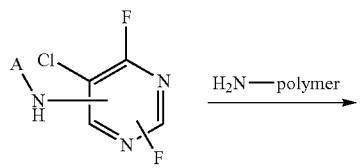
In one embodiment, the reaction of the poly(amidoamine) with the respective azo dye is conducted in the following sequence:
In one embodiment, in a first step, an aqueous solution or dispersion of the poly(amidoamine) C is provided.

In case of cold dyeing reactive anchors B [reactions 1) to 5)], the aqueous solution is heated to a temperature in the range of from 30 to 70° C., preferably 40 to 60° C., more preferably 45 to 55° C. such as 50° C.

In case of hot dyeing reactive anchors B [reactions 6) to 8)], the aqueous solution is heated to a temperature in the range of from 80 to 100° C., preferably 90 to 100° C. such as 95° C.

Subsequently, the reactive dye A-B in the form of an aqueous solution or dispersion is added in a drop-wise manner while stirring.

After the addition in a drop-wise manner has been completed, the resulting mixture may be further stirred for about 1 to 2 hours resulting in an aqueous solution of colorant A-B—C.

The term "solution" encompasses terms such as dispersion or emulsion.

If desired, in one embodiment, solvent may be removed by evaporation, and colorant A-B—C of formula (I) may be isolated. However, preferably, colorant A-B—C may be used as an aqueous solution in subsequent applications.

In one embodiment, colorant of formula (I) is provided in an amount of from 0.1 to 90% by weight in aqueous solution, based on the total amount of the aqueous solution, or from 0.1 to 80% by weight, or from 0.1 to 70% by weight, or from 0.1 to 60% by weight, or from 0.1 to 50% by weight, or from 0.1 to 40% by weight, or from 0.1 to 30% by weight, or from 0.1 to 20% by weight, or from 0.1 to 10% by weight.

In a third aspect, the invention relates to a composition comprising a colorant defined in the first aspect, or a colorant made according to a method defined in the second aspect, and a solvent selected from the group consisting of water and a polar organic solvent, or from a mixture of water and a polar organic solvent.

In one embodiment, the solvent comprises water or is water.

According to the invention, articles of manufacture may be dyed by means of the colorant, i.e. the polymeric dye as defined in the first aspect, or made by the method defined in the second aspect, or comprising the composition defined in the third aspect.

The colorants according to the invention typically have a slow staining factor and thereby reduce or eliminate staining on most hard surfaces, skin, fabrics and equipment. The term "staining" is synonymously used with the term "dyeing". Such colorants may often be cleaned up with cold water. The colorants are especially suited for non-ink applications requiring a low staining factor. For example, such applications include dyes for cleaning agents where it is desired that the dye does not tint the items to be cleaned.

The colorants of the present invention can be used over a wide pH range and are compatible with fragrances and preservatives, without complexing or destabilizing the resulting mixture. They are also compatible with most cationic and anionic, non-ionic and quaternary systems. Typically, these colorants are rather true solutions than emulsions or dispersions. The resulting formulations are clear and brilliant in appearance.

In a fourth aspect, the invention relates to an article of manufacture, comprising the colorant as defined in the first aspect, or the colorant made by the method defined in the second aspect, or comprising the composition defined in the third aspect.

In one embodiment, the article of manufacture is selected from the group consisting of cleaning agent, ink, colored pencil, or marker, or Megapearls®.

In one embodiment, the cleaning agent is selected from detergents and softeners.

The term "detergent" signifies a general term for terms such as washing-up liquid, dish liquid, dishwashing detergent, rinsing agent, scavenger, circulation fluid, drilling fluid, fluid, flush fluid, flush medium, flushing fluid, flushing medium, drilling fluid, air-water drilling fluid.

The term "softener" signifies a general term for terms such as fabric softener or fabric conditioner.

In a fifth aspect, the invention relates to the use of a colorant as defined in the first aspect, or made by the method defined in the second aspect, or comprising the composition defined in the third aspect, for dyeing or for dyeing cleaning agents, colored pencils, or markers.

In one embodiment, the use is for dyeing detergents and softeners.

In the following examples, parts and percentages are by weight and temperatures are reported in degree Celsius.

EXAMPLES

Example 1

Preparation Example 1 [Preparation of a Poly(Amidoamine)]

309.4 parts of diethylene triamine were placed under nitrogen in a multi-neck-reactor. While stirring, 300.2 parts of methyl methacrylate were added carefully. Then, during a period of 60 minutes, the reaction mixture was heated up to a temperature of 90° C. and was kept at that temperature for a period of further 2.5 hours. The temperature was increased to 145° C. in order to distill off methanol, and was kept at that temperature until no distilling of methanol could be observed. After distillation was terminated, the reaction mixture was cooled down to a temperature of approx. 95° C. Then, 465 parts of demineralized water were added continuously during a period of 30 minutes. Then, the aqueous PAMAM solution was cooled down to a temperature in the range of from 20-25° C.

One example of the resulting PAMAM polymer is of the following formula:

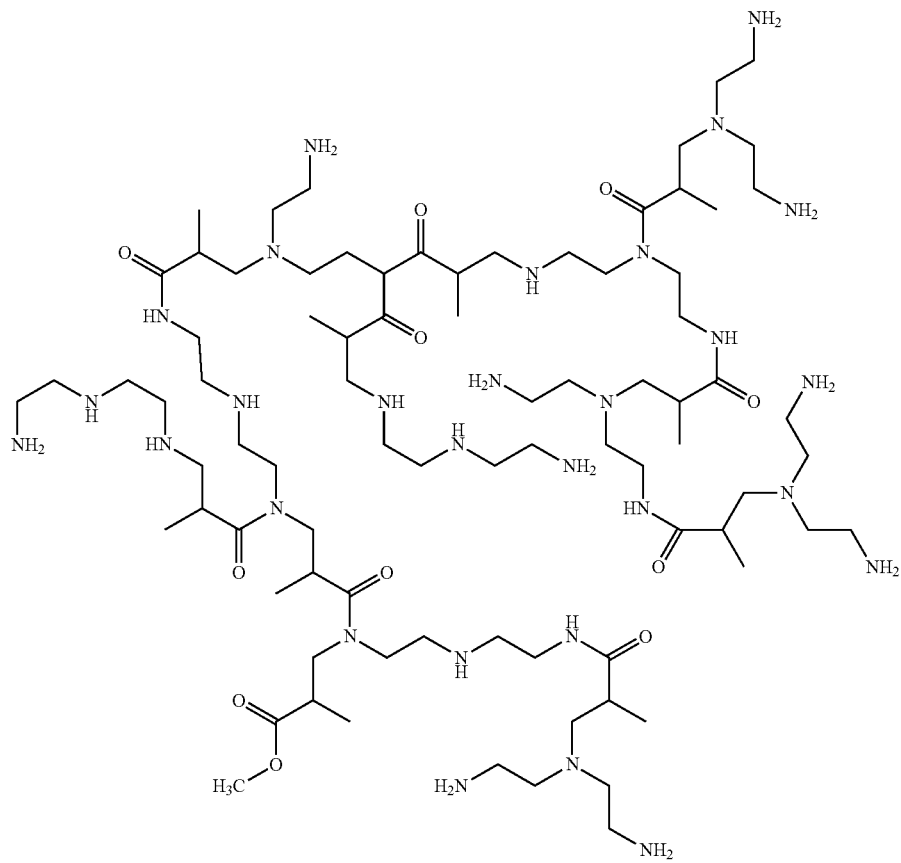 [SMILES: COC(=O)C(C)CN(CCNCCNC(=O)C(C)CN(CCN)CCN)C(=O)C(C)CN(CCNCCNC(=O)C(C)CN(CCN)CCC(C(=O)C(C)CNCCNCCN)C(=O)C(C)CNCCN(CCNC(=O)C(C)CN(CCN)CCNC(=O)C(C)CN(CCN)CCN)C(=O)C(C)CN(CCN)CCN)C(=O)C(C)CNCCNCCN]

Example 2-16

The following table contains acrylates and amines as starting materials for PAMAM polymers prepared similarly to the method described in Preparation Example 1. Molar ratio between acrylate and amino groups can vary, but the number of amino groups must exceed the number of acrylate units.

| Example | Acrylate | Amine |
|---|---|---|
| 2 | methyl methacrylate | H$_2$N-CH$_2$CH$_2$-NH-CH$_2$CH$_2$-NH-CH$_2$CH$_2$-NH$_2$ |
| 3 | methyl acrylate | do. |
| 4 | do. | H$_2$N-CH$_2$CH$_2$-NH-CH$_2$CH$_2$-NH$_2$ |
| 5 | do. | tris(2-aminoethyl)amine |

-continued

| Example | Acrylate | Amine |
| --- | --- | --- |
| 6 | do. | H₂N−CH₂CH₂−NH−CH₂CH₂−NH−CH₂CH₂−NH−CH₂CH₂−NH₂ (tetraethylenepentamine) |
| 7 | methyl methacrylate | do. |
| 8 | ethyl methacrylate | do. |
| 9 | ethyl acrylate | do. |
| 10 | ethyl methacrylate | H₂N−CH₂CH₂−NH−CH₂CH₂−NH₂ |
| 11 | ethyl acrylate | do. |
| 12 | methyl acrylate | Polyethylene imine (average $M_n$ ~1,200, average $M_w$ ~1300 measured by static light scattering) |
| 13 | methyl methacrylate | do. |
| 14 | do. | tris(2-aminoethyl)amine |
| 15 | methyl acrylate | do. |
| 16 | ethyl acrylate | do. |

Example 17

Preparation Example 17 [Preparation of a Polymeric Dye from a Reactive Dye A-B with a Poly(Amidoamine) to Afford Colorant A-B—C]

10.0 parts of C.I. Reactive Red 22 were dissolved in 300 parts of water and heated to a temperature in the range of from 80 to 85° C. Then 20.0 parts of the aqueous PAMAM-polymer of Preparation Example 1 were added dropwise during 15 minutes at pH in a range of from 9 to 9.5. The resulting mixture was stirred for 30 minutes. The pH was adjusted by addition of a sodium carbonate solution to a range of from 9 to 9.5 until reaction was completed. Then the red solution was cooled down to a temperature in a range of from 20 to 25° C. The solution could be diluted with water, if desired.

An example of one of the resulting polymeric dyes is of the following formula:

Preparation Examples 18-64

The following table shows reactive dyes and poly(amidoamine) PAMAM polymers as starting materials. The reaction temperature needed to prepare polymeric dyes in analogy to Preparation Example 17 was adjusted to the reactivity of the reactive dye and poly(amidoamine) used as starting material. In all examples, the molar ratio of one equivalent of the reactive dye and equivalents of the amino groups of PAMAM was kept between 0.25 to 4.

| Example | Reactive Dye | PAMAM | Temperature [° C.] |
|---|---|---|---|
| 18 | C.I. Reactive Black 1 | Example 1 | 90-95 |
| 19 | C.I. Reactive Black 5 | Example 5 | 75-80 |
| 20 | C.I. Reactive Blue 2 | Example 3 | 90-95 |
| 21 | C.I. Reactive Blue 2 | Example 6 | 90-95 |
| 22 | C.I. Reactive Blue 4 | Example 16 | 50-55 |
| 23 | C.I. Reactive Blue 4 | Example 1 | 50-55 |
| 24 | C.I. Reactive Blue 19 | Example 16 | 75-80 |

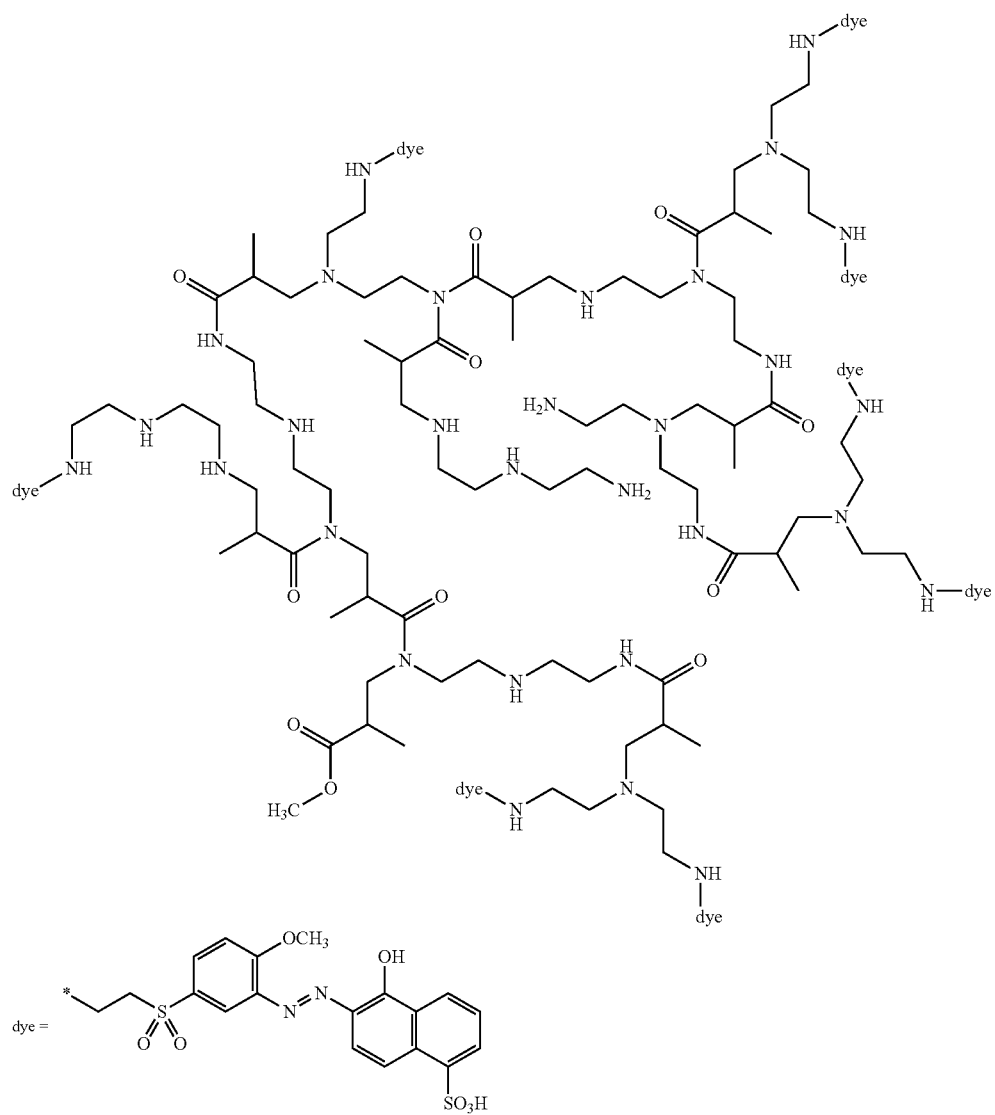

[* symbolizes the linkage with an amino group of the poly(amidoamine)]

-continued

| Example | Reactive Dye | PAMAM | Temperature [° C.] |
|---|---|---|---|
| 25 | C.I. Reactive Blue 19 | Example 1 | 75-80 |
| 26 | C.I. Reactive Blue 29 | Example 4 | 50-55 |
| 27 | C.I. Reactive Blue 94 | Example 9 | 60-65 |
| 28 | C.I. Reactive Blue 166 | Example 11 | 60-65 |
| 29 | C.I. Reactive Blue 225 | Example 1 | 75-80 |
| 30 | C.I. Reactive Brown 23 | Example 5 | 50-55 |
| 31 | C.I. Reactive Green 19 | Example 14 | 90-95 |
| 32 | C.I. Reactive Green 19 | Example 1 | 90-95 |
| 33 | C.I. Reactive Green 19 | Example 2 | 90-95 |
| 34 | C.I. Reactive Orange 7 | Example 15 | 75-80 |
| 35 | C.I. Reactive Orange 64 | Example 13 | 60-65 |
| 36 | C.I. Reactive Orange 67 | Example 1 | 60-65 |
| 37 | C.I. Reactive Red 1 | Example 7 | 50-55 |
| 38 | C.I. Reactive Red 4 | Example 7 | 90-95 |
| 39 | C.I. Reactive Red 17 | Example 10 | 90-95 |
| 40 | C.I. Reactive Red 22 | Example 8 | 75-80 |
| 41 | C.I. Reactive Red 22 | Example 1 | 75-80 |
| 42 | C.I. Reactive Red 120 | Example 8 | 90-95 |
| 43 | C.I. Reactive Red 41 | Example 2 | 50-55 |
| 44 | C.I. Reactive Red 198 | Example 2 | 80-85 |
| 45 | C.I. Reactive Red 198 | Example 12 | 80-85 |
| 46 | C.I. Reactive Red 198 | Example 1 | 80-85 |
| 47 | C.I. Reactive Red 219 | Example 16 | 60-65 |
| 48 | C.I. Reactive Red 220 | Example 3 | 50-55 |
| 49 | C.I. Reactive Red 220 | Example 7 | 50-55 |
| 50 | C.I. Reactive Red 241 | Example 1 | 80-85 |
| 51 | C.I. Reactive Red 241 | Example 2 | 80-85 |
| 52 | C.I. Reactive Red 241 | Example 14 | 80-85 |
| 53 | C.I. Reactive Red 241 | Example 3 | 80-85 |
| 54 | C.I. Reactive Violet 4 | Example 1 | 75-80 |
| 55 | C.I. Reactive Violet 4 | Example 4 | 75-80 |
| 56 | C.I. Reactive Violet 5 | Example 12 | 75-80 |
| 57 | C.I. Reactive Violet 5 | Example 1 | 75-80 |
| 58 | C.I. Reactive Violet 5 | Example 5 | 75-80 |
| 59 | C.I. Reactive Violet 46 | Example 15 | 90-95 |
| 60 | C.I. Reactive Violet 46 | Example 1 | 90-95 |
| 61 | C.I. Reactive Violet 46 | Example 2 | 90-95 |
| 62 | C.I. Reactive Yellow 174 | Example 16 | 75-80 |
| 63 | C.I. Reactive Yellow 174 | Example 12 | 75-80 |
| 64 | C.I. Reactive Yellow 184 | Example 2 | 75-80 |

The invention claimed is:

1. Colorant of formula (I):

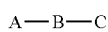

wherein in formula (I)
A comprises a monovalent organic residue comprising a chromophore group;
B comprises a bivalent organic residue selected from the group consisting of aromatic, heteroaromatic, cycloaliphatic and aliphatic groups containing from 2 to 10 carbon atoms, optionally substituted;
and
C comprises the residue of compound comprising amido groups, primary amino groups, secondary amino groups, and tertiary amino groups, wherein C is linked to B via a nitrogen atom of an amino group, and wherein said compound is a poly(amidoamine), wherein said poly(amidoamine) is the reaction product of a branched or non-branched amine selected from the group consisting of diethylene triamine, triethylene tetraamine, tetraethylene pentamine, and polyethylene imine, with an acrylate or methacrylate in a Michael-Addition, wherein the product formed in said Michael-Addition subsequently is subjected to polycondensation to derive said poly(amidoamine), and wherein said poly(amidoamine) C has an average molecular weight Mw of at least 10,000 g/mol.

2. Colorant according to claim 1, wherein A in formula (I) is an organic residue comprising one or more of the following chromophore groups: azo, azo metal complex, phthalocyanine, anthraquinone, aza[18]annulene, formazane-copper-complex, triphenodioxazine, nitroso, nitro, diarylmethane, triarylmethane, xanthene, acridine, methine, thiazole, indamine, azine, oxazine, thiazine, chinoline, indigoide, indophenol, lactone, aminoketone, hydroxyketone, or stilbene.

3. Colorant according to claim 1, wherein the average molecular weight Mw of said poly(amidoamine) is in the range of from 10,000 to 1,000,000 g/mol, the molecular weight being determined using static light scattering.

4. Method of making a colorant according to claim 1, wherein a reactive dye A-B is reacted with said poly(amidoamine) to afford colorant A-B—C.

5. Method according to claim 4, wherein B in the reactive dye A-B is selected from a residue comprising a moiety selected from the group consisting of dihalogenotriazine, dihalogenopyrimidine, trihalogenopyrimidine, dihalogenoquinoxaline, dihalogenophthalazine, sulfatoethylsulfone, chloroethylsulfone, vinylsulfone, α-halogenoacrylamide, and α,β-dihalogenopropionylamide.

6. Method according to claim 4, wherein B in the reactive dye A-B is selected from

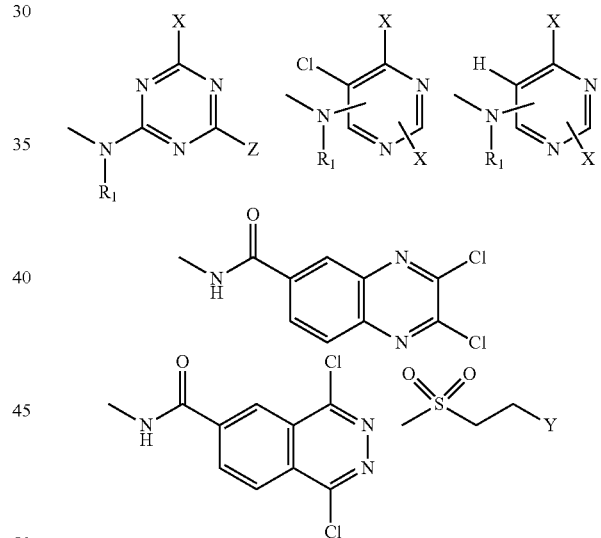

wherein the free valence symbolizes the link from B to A, and
wherein
$R_1$ is selected from H or substituted or unsubstituted $C_{1-10}$ alkyl group;
X is selected from F or Cl;
when X is Cl, Z is selected from —Cl, —$NR_2R_3$, or —$OR_2$;
when X is F, Z is selected from —$NR_2R_3$;
$R_2$ and $R_3$ are independently selected from the group consisting of H, substituted or unsubstituted $C_{1-10}$ alkyl, and substituted or unsubstituted aryl groups;
Y is any group which is detachable by alkali.

7. Method of making a colorant according to claim 4, wherein one equivalent of the reactive dye A-B is reacted with 0.25 to 4 equivalents of the poly(amidoamine).

8. Composition comprising a colorant according to claim 1, and a solvent selected from the group consisting of water, a polar organic solvent, and a mixture of water and a polar organic solvent.

9. Composition according to claim 8, wherein the solvent comprises water or is water.

10. Article of manufacture, comprising the colorant of claim 1, or comprising a colorant made by a method wherein a reactive dye A-B is reacted with said poly(amidoamine) to afford colorant A-B—C, or comprising a composition comprising said colorant.

11. Article of manufacture according to claim 10, wherein the article of manufacture is selected from the group consisting of cleaning agent, ink, colored pencil, and marker.

12. Article of manufacture according to claim 11, wherein the cleaning agent is selected from the group consisting of detergent and softener.

13. A method of dyeing cleaning agent, colored pencil, or marker comprising applying a colorant according to claim 1 to the cleaning agent, colored pencil, or marker.

14. A method of claim 13, wherein said cleaning agent is detergent or softener.

15. Colorant according to claim 1, wherein the average molecular weight Mw of said poly(amidoamine) is in the range of from 10,000 to 500,000 g/mol, the molecular weight being determined using static light scattering.

16. Method according to claim 6, wherein $R_1$ is H;

$R_2$ and $R_3$ are independently selected from the group consisting of H, methyl, ethyl, and phenyl group optionally substituted with one or more of —$SO_3H$ or —$SO_2CH_2CH_2Y$.

17. Colorant according to claim 1, wherein the branched or non-branched amine is reacted with a methacrylate in the Michael-Addition.

18. Article of manufacture, comprising the colorant of claim 1, or a composition comprising said colorant.

* * * * *